(12) United States Patent
Mule et al.

(10) Patent No.: US 9,084,026 B2
(45) Date of Patent: Jul. 14, 2015

(54) COMMANDING VIDEO DEVICE USING PROGRAM MOMENTS

(71) Applicant: Cable Television Laboratories, Inc., Louisville, CO (US)

(72) Inventors: Jean-Francois Mule, San Francisco, CA (US); Wiener Mondesir, Oakland, CA (US)

(73) Assignee: Cable Television Laboratories, Inc., Louisville, CO (US)

( * ) Notice: Subject to any disclaimer, the term of this patent is extended or adjusted under 35 U.S.C. 154(b) by 27 days.

(21) Appl. No.: 13/931,846

(22) Filed: Jun. 29, 2013

(65) Prior Publication Data

US 2015/0007231 A1    Jan. 1, 2015

(51) Int. Cl.
*H04N 7/173* (2011.01)
*H04N 21/482* (2011.01)
*H04N 21/472* (2011.01)
*H04N 21/435* (2011.01)

(52) U.S. Cl.
CPC ......... *H04N 21/4828* (2013.01); *H04N 21/435* (2013.01); *H04N 21/47202* (2013.01)

(58) Field of Classification Search
None
See application file for complete search history.

(56) References Cited

U.S. PATENT DOCUMENTS

| | | | |
|---|---|---|---|
| 8,607,291 B2 * | 12/2013 | Ryu | 725/116 |
| 2003/0101230 A1 * | 5/2003 | Benschoter et al. | 709/217 |
| 2008/0281926 A1 * | 11/2008 | Walter et al. | 709/206 |
| 2013/0170813 A1 * | 7/2013 | Woods et al. | 386/200 |
| 2014/0068670 A1 * | 3/2014 | Timmermann et al. | 725/40 |
| 2014/0122204 A1 * | 5/2014 | Hills et al. | 705/14.23 |

* cited by examiner

*Primary Examiner* — Nnenna Ekpo
(74) *Attorney, Agent, or Firm* — Great Lakes Intellectual Property, PLLC

(57) ABSTRACT

The navigation of video and other types of content based on program moments and/or key content is contemplated. The contemplated navigation may be beneficial in facilitating use of key parameters to enhance user experience and navigation when performed through a video device, a set top box (STB), a digital video recorder (DVR), a Web service or other video accessing service/device.

20 Claims, 5 Drawing Sheets

US 9,084,026 B2

COMMANDING VIDEO DEVICE USING PROGRAM MOMENTS

TECHNICAL FIELD

The present invention relates to commanding video devices and/or video services, such as but not necessary limited to commanding a set top box (STB), a digital video recorder (DVR) and/or a Web service according to program moments or other key programming events.

BACKGROUND

FIG. 1 illustrates a webpage 10 displaying a plurality of search results 12 uncovered by a video search engine as a function of a search query. The webpage 10 illustrates a plurality of videos found to be available on the Internet or other network matching a search query 14 submitted as "player home run". The search query 14 may have been entered through a Web browser operating on a computer, mobile phone, tablet or other sufficiently operable device to identify videos related to a particular event. The search engine performing the related search may be configured to search according to text, closed captioning, viewer recommendations, metadata and other types of alphanumeric references associated with uploaded or stored video and/or video to be broadcasted or otherwise transmitted in the future. Such Web-based searching capabilities may be beneficial in enabling users to facilitate streaming, downloading, over the top content (OTT) viewing or other accessing of video available from any number of video sources as a function of keyword searching or other complex or multi-faceted search strings and criteria.

While the webpage 10 is shown to correspond with searching video, a similar webpage and/or searching capabilities may be utilized to facilitate searching other types of content. The ability to utilize keywords with sophisticated searching algorithms may be used to enhance an ability of a user to quickly and easily identify content of interest. One non-limiting aspect of the present invention contemplates a need to facilitate integrating the enhanced searching capabilities of such webpages and the attendant Web-based searching processes with devices or systems having capabilities to access content through signaling mechanisms, delivery systems or transmission infrastructures other than the Web-based or OTT content delivery mechanisms typically employed to facilitate delivery of content identified within webpages.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 2:
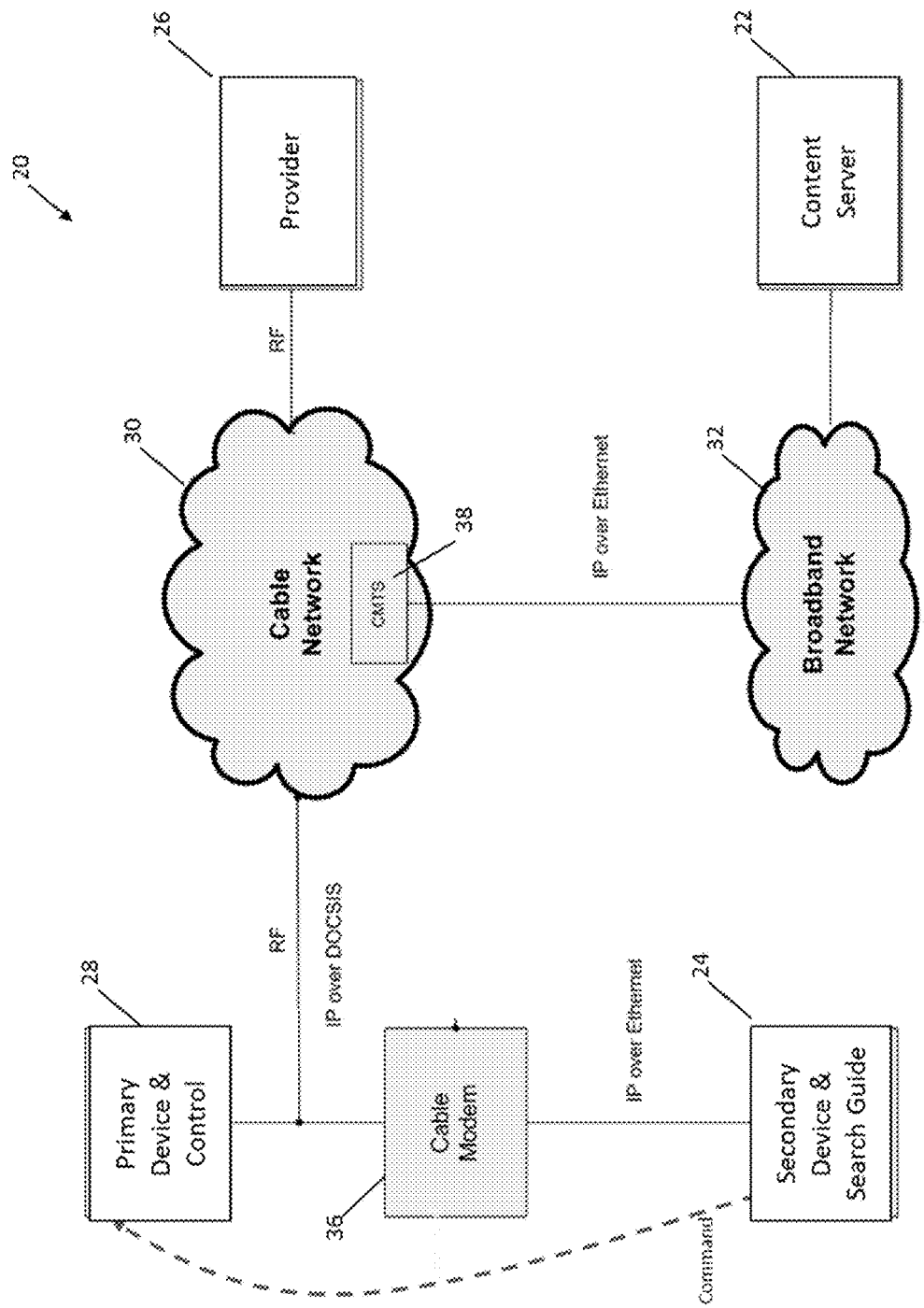
FIG. 2 illustrates a video navigation system in accordance with one non-limiting aspect of the present invention.

FIG. 2 illustrates a video navigation system 20 in accordance with one non-limiting aspect of the present invention. The system 20 illustrates a source 22 providing over-the-top (OTT) content to a secondary device 24 and a primary provider 26 providing non-OTT content to a primary device 28, such as in the manner described in U.S. patent application Ser. No. 13/889,523, the disclosure of which is hereby Incorporated by reference in its entirety. The primary provider 26 may be a cable television service provider, Internet service provider, cellular service provider and/or other provider of electronic services, such as a multiple system operator (MSO), operating an infrastructure sufficient to facilitate providing various signaling dependent services to a subscriber through wireless and/or wired communication mediums and structures. The primary provider 26 is shown to be associated with an infrastructure including a cable network 30 and a broadband network 32, which are separately depicted but may be included as part of the same network. The primary device 28 may include capabilities sufficient to facilitate interfacing signaling directly with the cable network 30 and a cable modem 36 or other intermediary device may be included to facilitate interfacing the broadband network 32 with the secondary device 24.

The cable network 30 is illustrated independently of the broadband network 32 in order to demarcate separate infrastructures within the control or support of the primary provider 26. This arrangement may correspond with the primary provider 26 utilizing a common wired/cable or other delivery mechanism (e.g., wireless) to transport television signaling and data signaling to a customer premise whereupon customer premise equipment (CPE), such as the primary device 28 and the cable modem 36, is then used to further process the signaling. This exemplary configuration of the system 20 demonstrates one non-limiting aspect of the present invention where separate mechanisms or infrastructures within the domain or control of a single provider may be used to facilitate delivery of the non-OTT content and the OTT content. In this manner, the OTT content may be considered as content sourced from an entity beyond the control or domain of the primary provider 26 over infrastructure provided by or in control of the primary provider 26 and the non-OTT content may be considered as content sourced from the primary provider 26 over infrastructure provided by or in control of the primary provider 26.

The nature of the media, data, information or other characteristics of the OTT content and the non-OTT content may in some cases be similar or the same. One non-limiting aspect of the present invention contemplates the OTT content being transmitted with Internet protocol (IP) signaling and/or through a broadband connection and the non-OTT content being transmitted with non-IP signaling and/or through a non-broadband connection. The IP signaling, which may be carried according to Data Over Cable Service Interface Specifications (DOCSIS) 3.0, the disclosure of which is hereby incorporated by reference in its entirety, may correspond with transmission of data packets or other data sets utilizing packet-switching capabilities and/or signaling complying with the Internet Protocol version 4 (IPv4) defined in IETF RFC-791 and the Internet Protocol version 6 (IPv6) defined in IETF RFC-2460, the disclosures of which are hereby incorporated by reference in their entireties. The non-IP or RF signaling may correspond with transmission of analog video content that has been digitized using FDM (Frequency Division Multiplexing), optionally utilizing circuit-switching capabilities. The broadband connection may be provided through the cable modem 36 and a cable modem terminal system (CMTS) 38 to facilitate a transmission medium that allows transmission of voice, data, and video simultaneously at rates of 1.544 Mbps or higher, optionally with media being carried using multiple channels—each at a different frequency or specific time slot. The non-broadband connection may be provided through the primary device 28 to facilitate the transmission of digitized video content.

Figure 1:
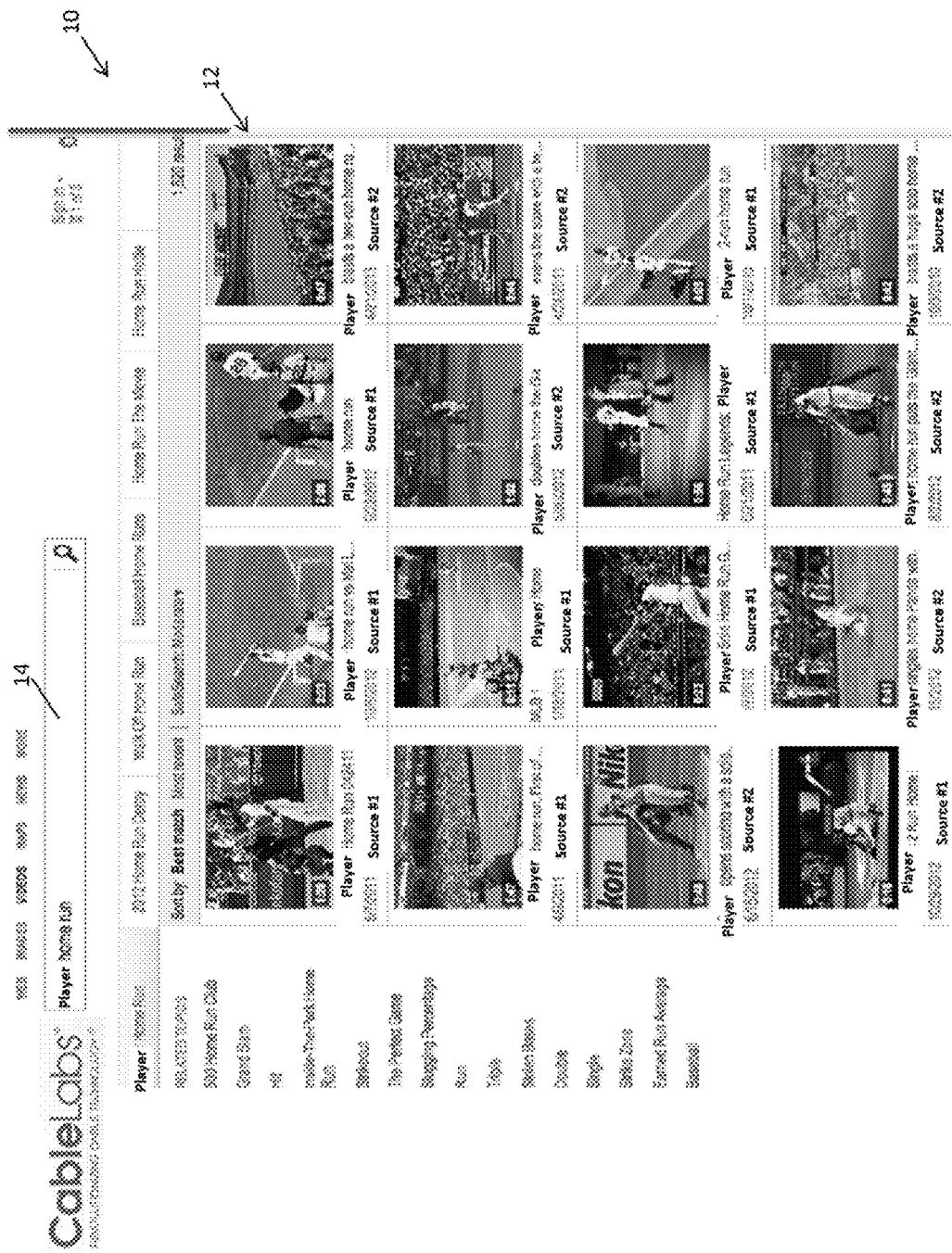
FIG. 1 illustrates a webpage displaying a plurality of search results as contemplated by the present invention.

The secondary device 24 may include a search guide application configured to facilitate generating webpages or other interfaces with a user. The search guide application may be embodied in a computer-readable medium having non-transitory instructions operable with a processor of the secondary device 24 and/or a computer program product to facilitate a second screen application. The secondary device 24 is shown to be separate from the primary device 28 for non-limiting purposes as the present invention fully contemplates the primary device 28 and the secondary device 24 being part of the same device. The second screen application may be a Web-based application operating with a Web browser and/or an electronic programming guide or other application configured to facilitate supplementing information or content being displayed within the primary device 28 and/or to facilitate issuing commands to facilitate controlling operation of the primary device 28. The search guide application may be configured to interface with the user using a touchscreen or other input sufficient to facilitate user input and content playback/access. The search guide application, for example, may be configured to facilitate display of the webpage 10 illustrated and FIG. 1, and depending on user action interaction therewith, access to video related to a particular search query 14 or otherwise identified as part of the search results 12. The video may be accessed through communications carried over the broadband and/or cable networks 30, 32.

The primary device 28, for example, may be configured as a set top box (STB), a digital video recorder (DVR) or other device configured to facilitate accessing content, television programming, video or other media, which hereinafter is collectively referred to as video for exemplary non-limiting purposes. The second screen application may be configured to identify capabilities of the primary device 28 and to facilitate related content control commands, e.g., tuning to channels, setting video recordings, ordering videos on demand, etc. The primary device 28 may include a control application or other feature to facilitate its operation and/or processing commands received from the secondary device 24. The primary device 28 may be configured to descramble television related signaling or other signaling carried over IP or the cable network 30 in contrast to the cable modem 36 being configured to process data packets and other information carried over the broadband network 32 by way of the CMTS 38. In this manner, video sourced from the content server 22 or other OTT sources associated with the content server 22 may be carried through the cable modem 36 to the secondary device 24 and video or other content sourced from the provider 26 may be carried directly to the primary device 28. While described with respect to demarcating separate means for delivering video from the provider 26 and the content server 22, the present invention fully contemplates the video available through the content server 22 being transmitted or otherwise delivered directly to the primary provider 26 for subsequent delivery.

Figure 3:
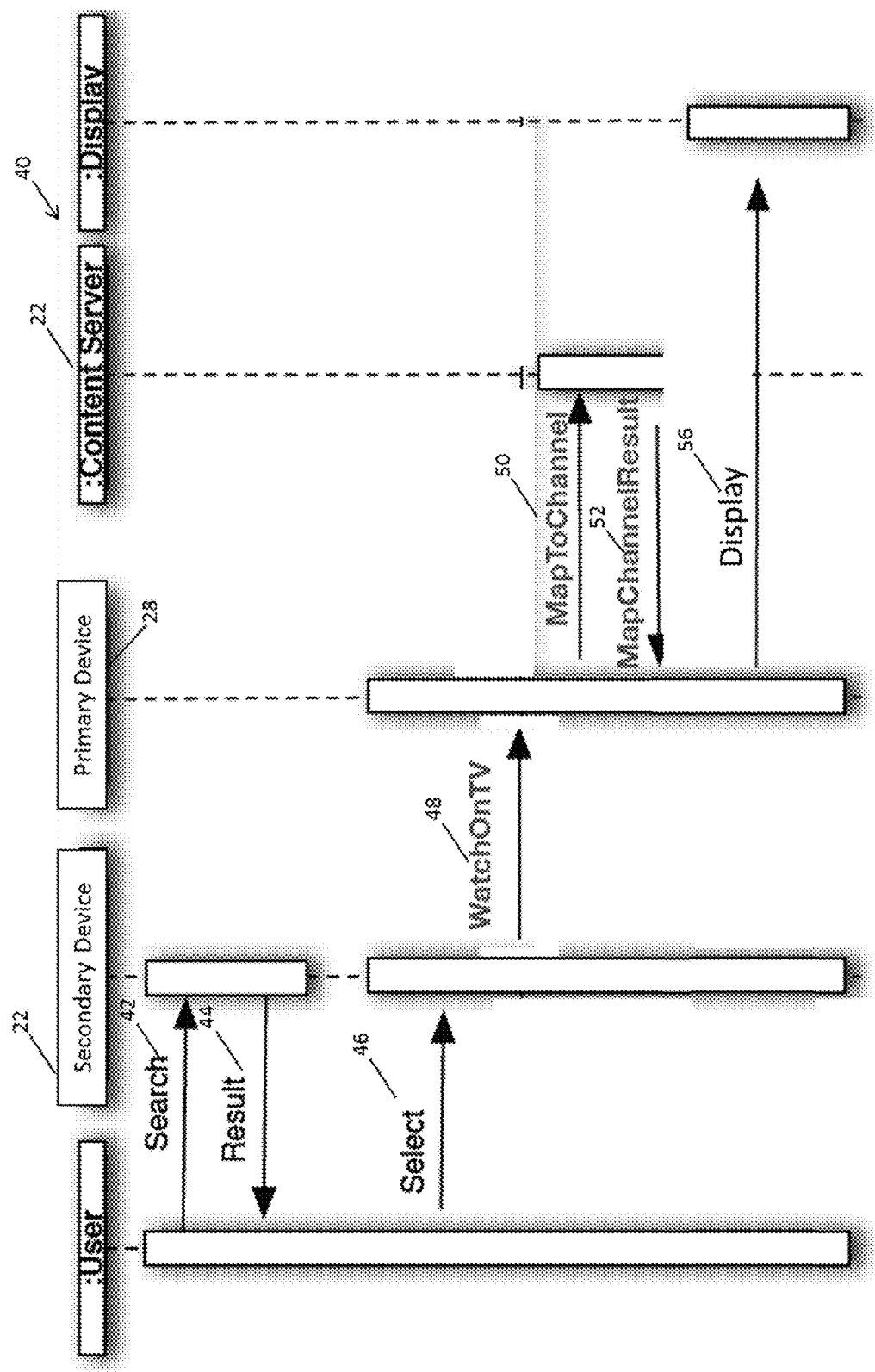
FIG. 3 illustrates a flowchart of a method for commanding according to program moments in accordance with one non-limiting aspect of the present invention.

FIG. 3 illustrates a flowchart 40 of a method for commanding the primary device 28 according to program moments in accordance with one non-limiting aspect of the present invention. The method is predominately described with respect to commanding the primary device 28 to facilitate video navigation for exemplary non-limiting purposes as the present invention fully contemplates its use and application in facilitating navigation of non-video content. The program moments may relate to information, clips, highlights, events or other activities associated with an accessed or tuned to video, such as but not limited to related video, e.g., video of a similar event provided from another source, a friend or otherwise deemed relevant, such as based on other use viewing habits, trending information, historical usage, etc. The contemplated use of program moments may be beneficial in providing a user access to other sources of video related to a selected or accessed video in order to facilitate navigation thereto. Optionally, advertising and/or other supplemental information may be designated as program moments, key events or otherwise included with the program moment related navigation to facilitate drawing the user's attention to corresponding subject matter, such as to facilitate drawing the user away from OTT content to non-OTT content and/or other services offered or accessible from the primary provider 26.

A search process 42 may correspond with the user engaging the screen application or other feature of the secondary device 24. The search process may relate to the user inputting a search query, keywords or other identifying information to the webpage 10 of FIG. 1 or inputting similar information into an electronic programming guide (EPG) or other tool operable on the secondary device 24 to facilitate initially identifying video desired for viewing. One non-limiting aspect of the present invention contemplates an iterative search process where the user may input multiple search queries to the webpage 10 to initiate a search at a remote search engine (not shown) and/or the content server 22 in order to generate a search result. The inputted search queries and/or navigation of webpages or other portals following display of corresponding search results may be monitored to identify a user's intent when assessing or evaluation one or more pieces of relevant video for subsequent viewing. Metadata or other information may be generated by the second screen application to track the user's intention when navigating for desired video. The secondary device 24 may undertake various activities in order to identify search results related to the search query, including maintaining a database reflective of the users activities to facilitate generating the metadata relating to the user's intentions.

A result process 44 may correspond with the secondary device 24 displaying or otherwise providing a search result. The search result may be displayed in the form shown in the webpage 10 of FIG. 1 in order to facilitate user navigation and manipulation of the search results. The search results are shown for exemplary non-limiting purposes with respect to identifying the underlying video using a static image or caption from the corresponding video. A timing reference, running length or other temporal identifier may be included within the search results to identify length of the corresponding video. One non-limiting aspect of the present invention contemplates searching for video segments or video clips having a running length less than an entire length of the corresponding video or related programming, e.g., identify highlights of a player hitting a home run as opposed to an entire video showing the entirety of the related baseball game.

In this manner, the user may be enabled to identify shorter video segments are clips of interest so that the particular portion of the video can be easily navigated to rather than having to search through an entire length of the program or a longer video having events of less interest The search results may include identifying information, parameters, tuning requirements, operational capabilities and/or other information related to the underlying video segment. This information may include media time references or other timestamps associated with the corresponding video segment in order to facilitate identifying a beginning and an ending of the underlying video having that event of interest, which may be utilized to facilitate navigating to or requesting the particular portion of the video determined to be of interest and identified within the search results. The search engine, content server 22 or other feature used to facilitate the searching may be configured to automatically determine the corresponding time references or other information that may be necessary to facilitate access to the desired video segment. The search results may also identify additional information related to the video segments, such as a program name or a unique reference for the related program to which the video segment of inches relates. The video identification information may be formatted or specified according to the nomenclature described within the Entertainment Identifier Registry (EDIR), the disclosure of which is hereby Incorporated by reference in its entirety.

Figure 4:
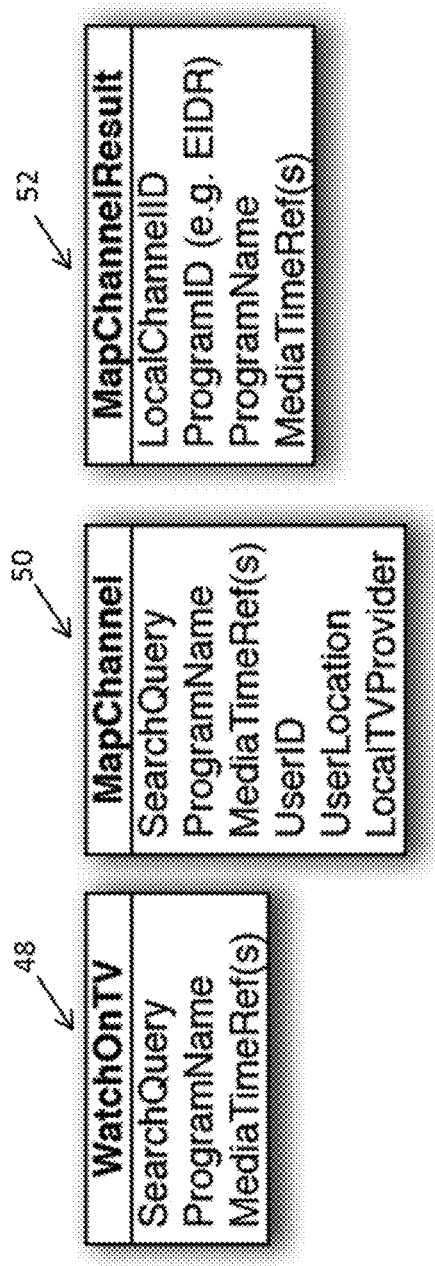
FIG. 4 illustrates messages in accordance with one non-limiting aspect of the present invention.

A selection process 46 may correspond with the user providing a suitable input to the secondary device 24 to indicate selection of one of the videos uncovered in the search results. The input may be discerned with the secondary application in response to clicking on the corresponding image or link provided within the search results webpage. A command process may correspond with the second screen application facilitating transmission of a content control command to the primary device 28, which for exemplary non-limiting purposes is illustrated as a WatchOnTV message 48. The WatchOnTV message 48 may be formatted to facilitate commanding the primary device 28 to access a selected one of the videos identified within the search results shown on the secondary device 24. FIG. 4 illustrates the WatchOnTV message 48 in accordance with one non-limiting aspect of the present invention. The WatchOnTV message 48 is shown to include metadata related to the intention of the user when identifying the selected video. The metadata is shown for exemplary non-limiting purposes to correspond with a search query, a program name, and include associated parameters such as a media time reference. Optionally, historical information or other information gleaned regarding the user's intention while navigating the search related webpage(s) may be included as part of the metadata.

The search query may relate to the particular search term input in order to generate the search results having the selected video. Optionally, the search query may include multiple search queries relating to the search queries previously input prior to generating the search results having the selected video. The program name may relate to a title assigned to the selected video. In the event the video is a video segment or clip taken from a longer video, the program name may relate to a particular title assigned to the particular video clip, as opposed to the title assigned to the video from which the clip is obtained. The media time reference may correspond with a beginning and ending of the video clip as referenced to universal time or another time reference suitable to facilitate retrieval of the corresponding video. The search results shown within the webpage may include links or other identifiers for the underlying video such that the entire video is not necessary provided or downloaded to the secondary device at the time of displaying the search results. The media time references may be beneficial in this scenario to facilitate identifying the video segment from within a larger video segment when facilitating access to the selected video through the primary device 28.

A channel request process may correspond with the primary device 28 issuing a channel request to the content server and/or or the primary provider in order to facilitate access to the selected video. The channel request is shown for exemplary non-limiting purposes to correspond with a MapToChannel message 50. FIG. 4 illustrates the MapToChannel message 50 in accordance with one non-limiting aspect of the present invention. The MapToChannel message 50 may include some of the metadata included within the WatchOnTV message 48, such as but not necessary limited to the search query, the program name and/or the media time reference identified for the selected video. Additional information may be included to identify the primary device 28 and/or a user associated therewith, such as with addition of a user ID, a user location and a local TV provider. The user ID may be used to convey a unique user ID associated with the user and/or the primary device 28, such as to facilitate identifying user entitlements and/or subscription services. The user location may be used to identify the current location of the primary device 28 through which the selected videos are desired for access and/or other information regarding capabilities of the primary device 28 to facilitate access to the video, such as to facilitate identifying suitable video sources of the primary provider 26 and/or the content server 22 from which the primary device 28 may be automatically controlled to access the selected video. The local TV provider may be used to identify the current provider 26 of the primary device 28 in order to further facilitate access to the selected video, such as to identify a channel showing the corresponding video and/or a resource available to the local TV provider from which the video may be accessed.

A channel result process may correspond with the entity receiving the channel request responding with accessing information suitable for use with the primary device 28 to access the selected video. The channel result is shown for exemplary non-purposes to correspond with a MapChannelResult message 52. FIG. 4 illustrates the MapChannelResult message 52 in accordance with one non-limiting aspect of the present invention. The MapChannelResult message 52 may include information required to control the primary device 28 to access the selected video and/or to display information related to the selected video. The MapToChannel message 52 is shown to include a local channel ID, a program ID, a program name and a media time reference. The local channel ID may correspond with signaling required to be accessed to by the primary device 28 in order to access the selected video, such as a television channel and/or the time at which the television channel should be tuned to, a VOD identifier or other on-demand reference sufficient to facilitate downloading the selected video on demand, a DVR reference or other command sufficient to facilitate retrieving the selected video from a DVR recording previously stored at the primary device 28 and/or to facilitate setting a DVR recording of the selected video should the selected video be transmitted at a future time. The program name may be included to identify the program name included within the metadata in order to facilitate displaying graphical information and/or to facilitate advertisement insertion or other processes dependent on identifying the selected video or the video from which the selected videos obtain. The media time reference may correspond with the media time reference identified within the metadata transmitted from the second screen device in order to facilitate controlling the primary device 28 to the corresponding portion of the selected video.

One non-limiting aspect of the present invention contemplates including multiple identifiers or multiple pieces of information within the MapChannelResult message 52. The multiple identifiers may be included in addition to the information specified for the selected video in order to identify additional videos deemed to be related to the selected video. The content server 22 may be configured to perform a program moments search following receipt of the MapToChannel message 50 in order to identify program moments or other video segments and/or events related to the selected video identified within the MapToChannel message 50. In this manner, the program moments search may be performed independently of the search performed at the secondary device 24 based on the metadata included within the content control command, i.e., watch on TV message 48, transmitted from the secondary device 24 to the primary device 28 and subsequently passed through within the MapToChannel message 50. The program moments searching may be beneficial in allowing the primary device 28 to instigate a secondary search or supplemental search for program moments following receipt of a control command intended to control the primary device 28 to access the selected video. This program moments search may be useful in facilitating navigation to video related to the selected video and/or video believed to be more relevant to the user based on information available to the primary provider 26 and/or the content server 22 that may not have been available to the search engine operating on the secondary device 24.

The program moments search may optionally be limited to video within a permissions domain or otherwise associated with the user and/or the primary device 28 whereas the initial search performed on the secondary device 24 may not be so limited. Limiting the program moments search in this manner may be beneficial in ensuring that additional videos deemed relevant to the selected video are limited to those that are capable of being access through the primary device 28. The content server 22 may communicate with the primary device provider 26 to identify the capabilities and/or entitlements of the user and/or the primary device 28 when searching for the additional videos. The program moments search may also be limited to assets within the domain of the primary device 28, such as to local DVR, VOD and/or non-OTT content. The DVR related search limitations may be beneficial in drawing attention to additional videos previously stored on the DVR as those videos may be deemed to be more likely of interest the user. The VOD and/or non-OTT content search related limitations may be beneficial in drawing attention to assets or capabilities associated with a particular provider, such as to enhance use of that provider's services. The ability to conduct the program moments search based on metadata or other information included within the content control command issued to the primary device 28 may be beneficial in eliminating the user interactions performed to facilitate searching through the second screen application.

The program moments search need not necessarily be limited to particular resources or content sources and may be performed in the same or similar manner as the initial search associated with the search process 42, i.e., using a search engine include as part of the content server 22 or otherwise available over the Web. The search query used form the program moments search may correspond with some combination of the program name of the selected video, the program name or other identifying information of the selected video and/or other information deemed relevant to the primary device 28, e.g., past VOD purchased, scheduled DVR recordings, information associated with social media related to the subscriber or other subscribers of the primary provider 26 and/or private information limited to storage at the primary device 28, e.g., home demographics, parental controls, etc. The search results uncovered as part of the program moments search may optionally be filtered prior to inclusion within the MapChannelResult message 52 in order to limit identification of related video to those deemed most relevant or particular to the primary device 28 and the user thereof. Once the additional videos uncovered as part of the program moments search are identified and information related to accessing the corresponding videos are specified, the corresponding MapChannelResult message 52 may be transmitted to the primary device to facilitate display of the selected video and the program moments related video.

Figure 5:
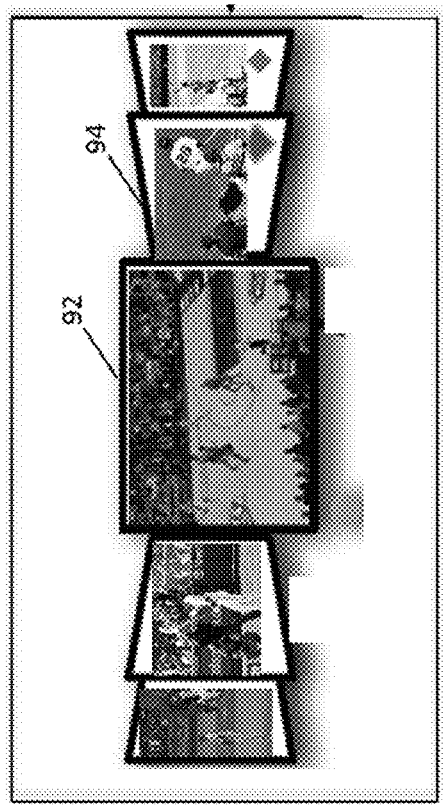
FIG. 5 illustrates a timeline display in accordance with one non-limiting aspect of the present invention.

A display process 56 may correspond with the primary device 28 processing the MapChannelResult message 52 to facilitate access to the selected video and navigation of the additional videos uncovered as part of the program moments search. FIG. 5 illustrates a timeline display 60 in accordance with one non-limiting aspect of the present invention. The timeline display 60 may correspond with a display associated with the primary device 28 displaying the selected video within a first window 62 and a timeline within a second window 64. The first window 62 may include navigation features (not shown) or be associated with other controls sufficient to facilitate playback of the selected video. The playback may begin with the user may navigating to the desired portion of the video and/or the media time references included in the MapChannelResult message 52 may be relied upon to begin playback at a desired portion of the video. The timeline may include a plurality of visuals to act as navigational guides for the selected video and the additional videos. The visuals are shown to correspond with vertical lines where a centerline 66 corresponds with the selected video and additional lines positioned leftward and rightward thereof each correspond with one of the additional videos. The leftward and rightward lines may be selected to facilitate navigating to the corresponding video, i.e., to begin playback of the additional video within the first window. Optionally, the vertical lines positioned to leftward of the centerline 66 may correspond video occurring at a period of time before the selected video and the vertical lines positioned to the rightward of the centerline may correspond with video coring after the selected video.

Figure 6:
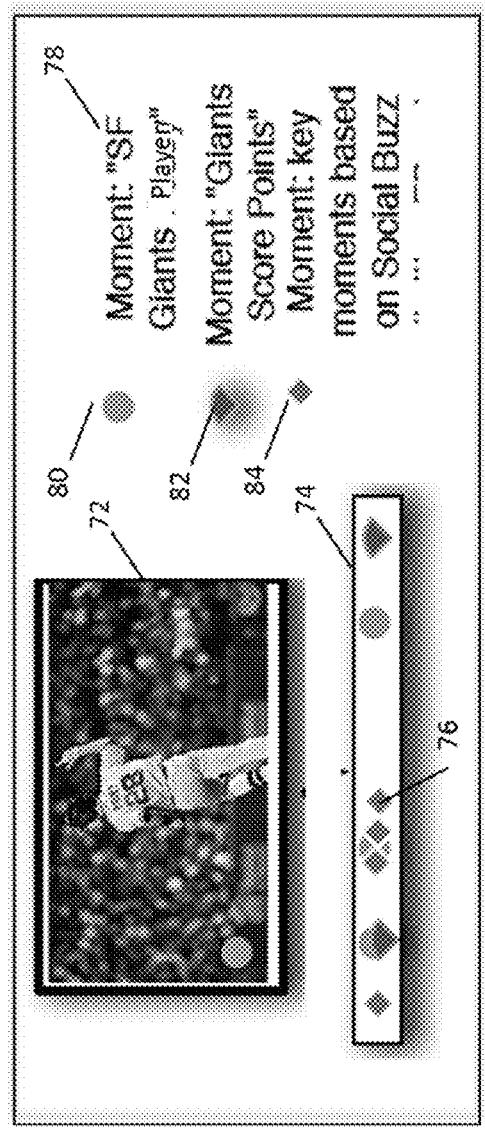
FIG. 6 illustrates an icon display in accordance with one non-limiting aspect of the present invention.

FIG. 6 illustrates an icon display 70 in accordance with one non-limiting aspect of the present invention. The icon display 70 may correspond with the display displaying the selected video within a first window 72 and an icon bar within a second window 74 where the first window may operate in the manner described above with respect to FIG. 5. The icon bar may include a plurality of icons 76 to provide visual navigation guides to the additional videos uncovered as part of the program moments search. Each of the videos may be associated with one of the icons with some of the icons being used to identify multiple videos having related content or otherwise having an association with each other. A legend 78 may be included with textual descriptors to facilitate relating the icons 76 to corresponding program moments and/or to convey information regarding a relationship category assigned to the corresponding additional video. The legend 78 is shown for exemplary purposes to correspond with a first icon 80 identifying a first search query, such as the query associated with the search process, a second icon 82 identifying a second search query, such as the query associated with the program moments search, and a general moments icon 84 identifying additional video determined to be relevant based on social buzz, social media, trending or other information based on group dynamics. User selection of one of the icons in the icon bar may be used to navigate to the corresponding video. In the event one of the additional videos is navigate to, an icon may be displayed within the icon bar to facilitate navigating back to the initially selected video.

Figure 7:
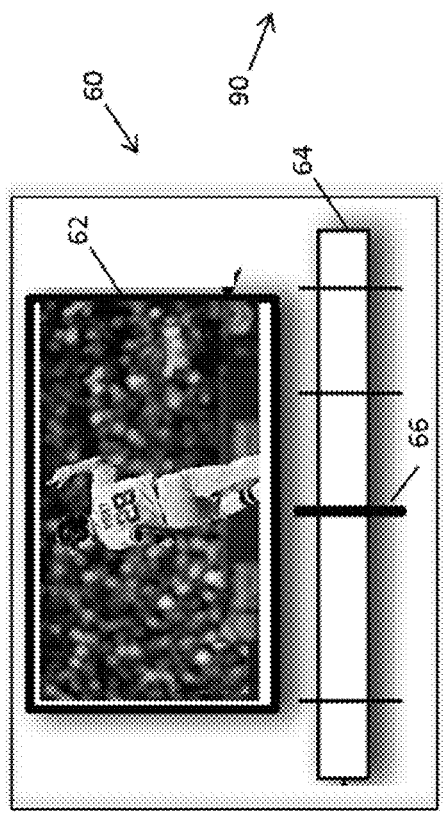
FIG. 7 illustrates an image frame display in accordance with one non-limiting aspect of the present invention.

FIG. 7 illustrates an image frame display 90 in accordance with one non-limiting aspect of the present invention. The image frame display 90 may correspond with the display displaying the selected video within a first window 92 and the additional videos within one of a plurality of additional windows 94. The additional windows 94 may be provided on either side of first window 92 to represent relative timing of the corresponding video and/or a ranking of believed relevance, e.g., user preference may dictate including the additional videos likely to be of most interest, such as those available from the DVR, closer to the first window 92 and less relevant videos outwardly thereof. While the selected video plays within the first window 92, static images captured from the additional images may be displayed within the additional video windows 94. Optionally, icons or other descriptors may be included with the displayed videos to facilitate navigational operations. As with the other display capabilities noted above, the additional videos may be navigated to through various operations and the originally selected video may be navigated to following navigation to one of the additional videos. During such navigation, different ones of the additional videos may be displayed using scrolling operations, and at least in the case of the image from display, the navigation may be performed in the background while one of the videos is being played within the first window.

The display process and the attendant navigation may be performed as a function of instructions provided directly to the primary device 28, e.g., as a function of IR signaling received from a remote control, and/or as a function of addition command signals received from the secondary device 24, e.g., the secondary device 24 may be configured to transmit additional commands to control navigation as function of user interaction with the second screen application. The foregoing describes various operations as being performed with a certain one of the secondary device 24, the primary device 28, the content server 22 and/or the primary provider 26 for exemplary non-limiting purposes as the corresponding operations may be performed by other devices. In particular, the secondary device 24 and/or second screen application may be used in place of or in addition to the primary device 28 to facilitate the program moments search. The primary device 28, for example, may be configured to relay the MapChannelResult 52 to the second screen device 22 for corresponding processing, including display and navigation of the selected and additional videos through the secondary device 24. This processing may be beneficial in leveraging user interaction capabilities of the secondary device 24 to facilitate navigating the selected and additional videos on the secondary device 24, which may accept user inputs more readily than the primary device 28. Optionally, the second screen application may be configured to manipulate the secondary device 24 in concert with display changes on the primary device 28 such that information being displayed on the primary and secondary devices 28, 24 mimic each other, which may be beneficial if multiple people are viewing the primary device 28 and it is desirable for one person to navigate video through the secondary device 24.

As supported above, one non-limiting aspect of the present invention contemplates enabling a second screen application or other device controlling the primary device to tune to television channels or other access content to tune or record a program by simply passing the channel number or program identifier to a STB via Infrared or APIs. The present invention also contemplates enhancing such control commands with use of an expanded set of parameters to be passed to a STB, DVR or Web Service with control commands, which may include a listing of key show moments to highlight after the command is executed. One contemplated process may include an application initiating a STB, DVR or Web Service command to tune, record, play, pause, fast forward or rewind using a complex set of parameters to facilitate the contemplated program moments control, including a set of attributes for each show moment comprising: Timeoffset: atomic time offset, an "instant" in that program; Timeoffset range (start-end) of a show moment; and a set of alphanumerical values: some represent most viewed events, some represent the appearance of a word in the closed captioning based on a searched filter criteria, some may be indicative of the importance of these events based on the demographics, region, viewership on a cable network, twitted moments, positive vs. negative sentiment moments during that show, etc.

One non-limiting aspect of the present invention contemplates a richer user interface based on many content discovery methods. Example: a user searches for TV shows covering the President, the search engine returns not only the list of channel, VoD asset, DVR programs that mention or cover the President but it also provides a list of program moments where the President appeared in the audio caption (audio search), video (face recognition search). Thereby, when the user tunes or taps on one of these search results, the User Interface tunes my TV or Video player to the program highlighting a timeline under the video underlining where the President was covered with some special icons indicative of the numerical values.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of commanding a settop box (STB) as function of content control commands associated with a second screen application, the method comprising:

identifying a first content control command wireless transmitted from a secondary device operating the second screen application to the STB, the first content control command commanding the STB to access a first video segment;

determining one or more first program moments as a function of first metadata included with the first content control command, each of the first program moments being associated with a different one of a plurality of first additional video segments;

commanding the STB to display one or more first visuals during display of the first video segment, each of the first visuals representing one of the first program moments;

determining user selection of a first selected visual, the first selected visual being one of the displayed first visuals; and commanding the STB to access a second video segment, the second video segment being the one of the first additional video segments associated with the first selected visual.

2. The method of claim 1 further comprising performing a first search following identification of the first content control command, the first search uncovering the first program moments as a function of the first metadata.

3. The method of claim 2 further comprising performing the first search independently of the secondary device and the STB based on a search term input by a user to the secondary device, the first metadata identifying the search term.

4. The method of claim 2 further comprising performing the first search independently of the secondary device and the STB based on a program name identified by the second screen application, the first metadata identifying the program name.

5. The method of claim 2 further comprising performing the first search independently of the secondary device and the STB at a content server as a function of a channel request transmitted from the STB, the STB transmitting the channel request to obtain tuning instructions necessary for accessing the first video segment, the content server identifying the first program moments as a function of information derived from the first metadata and included within the channel request.

6. The method of claim 5 further comprising determining the first program moments from a channel result transmitted to the STB from the content server, the channel result being generated by the content server in response to receipt of the channel request, the STB generating at least a portion of the first visuals from information included in the channel result identifying at least a portion of the first program moments.

7. The method of claim 6 further comprising commanding the STB to access the second video segment as a function of tuning instructions included within the channel result.

8. The method of claim 2 further comprising:
performing a second search following the STB accessing the second video segment, the second search being performed automatically upon the STB accessing the second video segment and without contemporaneous user input, the second search uncovering one or more second program moments, each of the second program moments being associated with a different one of a plurality of second additional video segments related to the second video segment;
commanding the STB to display one or more second visuals during display of the second video segment, each of the second visuals representing one of the second additional video segments;
determining user selection of a second selected visual, the second selected visual being one of the displayed second visuals; and
commanding the STB to access a third video segment, the third video segment being the one of the second additional video segments associated with the second selected visual.

9. The method of claim 1 further comprising displaying the first visuals within a timeline bar, selection of the first selected visual from the timeline bar commanding the STB to access the second video segment.

10. The method of claim 9 further comprising configuring the timeline bar to identify at least a portion of the first visuals with vertical lines, each vertical line being positioned leftwardly or rightwardly from a centerline, the centerline representing a first time associated with the first video segment, each vertical line being positioned leftwardly or rightwardly of the centerline depending on whether the corresponding first program moments occur before or after the first time.

11. The method of claim 1 further comprising displaying the first visuals as icons within an icon bar, at least two or more of the first program moments being represented with the same icon at the same time within the icon bar, wherein selection of the icon corresponding with the first selected visual commands the STB to access the second video segment.

12. The method of 11 further comprising displaying a legend proximate to the icon bar, the legend including textual descriptors for the icons included within the icon bar.

13. The method of claim 1 further comprising displaying the first visuals as image frames positioned proximate to the first video segment, selection of the image frame showing the first selected visual commanding the STB to access the second video segment.

14. A method of commanding a video device as function of content control commands received from a secondary device operating a second screen application, the method comprising:
identifying a first content control command transmitted from the secondary device to the video device, the first content control command commanding the video device to access a first video, the first content control command including first metadata related to the first video;
performing a first program moments search based on the first metadata to determine a plurality of second videos related to the first video;
commanding the video device to display one or more first visuals during display of the first video, each of the first visuals representing one of the second videos;
determining user selection of a first selected visual of the displayed first visuals; and
commanding the video device to access a first selected video corresponding with the one of the second videos associated with the first selected visual, including commanding the video device to access the first selected video without communicating with the second device at least during a period of time occurring from receipt of the first content control command and display of the first visuals.

15. The method of claim 14 further comprising performing the program moments search as a function of a search query, the search query being included as at least part of the first metadata transmitted from the secondary device to the video device as part of the first content control command used to command the video device to access the first video.

16. The method of claim 15 wherein the first search query is determined by the second screen application as a function of a Web search executed on the second device, the Web search identifying the first video and being performed as a function of user inputs to the second device, and performing the second program moments search independently of the video device at a content server.

17. The method of claim 16 further comprising:
performing a second program moments search based on second metadata determined for the selected video, the second metadata being determined independently of the second device and the second screen application, the second program moments search determining a plurality of third videos related to the selected video;
commanding the video device to display one or more second visuals during display of the second video, each of the first visuals representing one of the third videos;
determining user selection of a second selected visual of the displayed second visuals; and
commanding the video device to access a second selected video corresponding with the one of the third videos associated with the second selected visual.

18. The method of claim 17 further comprising performing the second program moments search by commanding the video device to issue a search request to a content server, the content server being located remotely from the video device, the content server identifying at least a portion of the third videos.

19. A video device comprising:
- at least one or more network interfaces configured to facilitate communications with a content server and a secondary device;
- an output configured to facilitate displaying video to a user;
- a processor; and
- a computer-readable medium having non-transitory instructions operable with the processor to facilitate navigating video available from the content server, the computer-readable medium including non-transitory instructions sufficient for:
- identifying a content control command transmitted from the secondary device to the video device, the content control command commanding the video device to access a first video, the content control command including metadata related to the first video;
- transmitting a program moments search request to the content server to identify a plurality of second videos related to the first video, the program moments search request being based on the metadata;
- commanding the video device to display one or more visuals during display of the first video, each of the visuals representing one of the second videos identified by the content server;
- determining user selection of a selected visual of the displayed visuals; and
- commanding the video device to access a selected video corresponding with the one of the second videos associated with the selected visual.

20. The video device of claim 19 wherein the metadata identifies a search query input by the user to the secondary device to identify the first video, the search query being included within the content control command transmitted to the video device and the program moments search requests transmitted to the content server, the content server relying at least partially on the search query to identify the plurality of second videos.

* * * * *